UNITED STATES PATENT OFFICE.

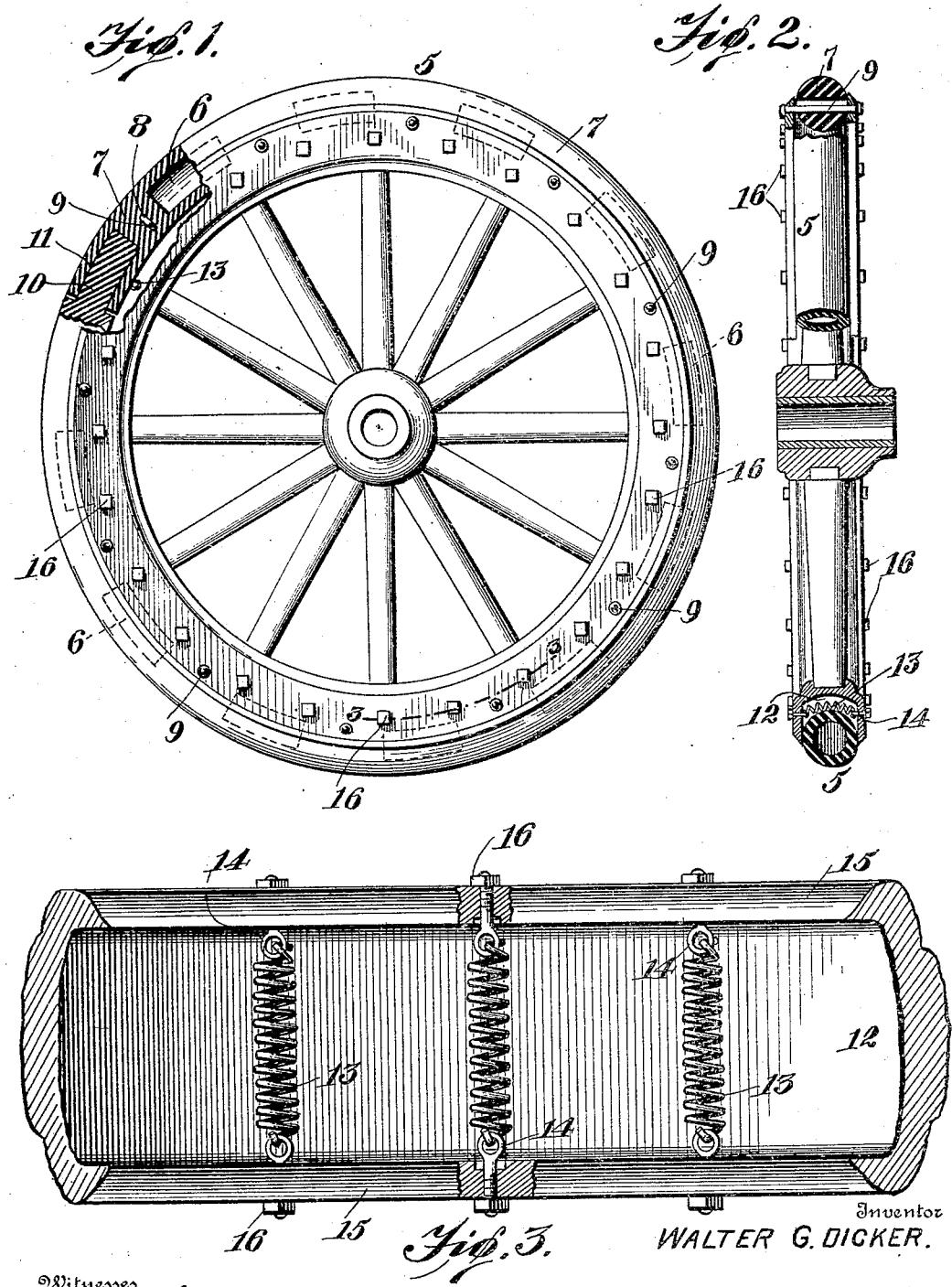

WALTER G. DICKER, OF GILBY, NORTH DAKOTA.

AUTOMOBILE-TIRE.

943,396.  Specification of Letters Patent.  Patented Dec. 14, 1909.

Application filed January 25, 1909. Serial No. 474,049.

*To all whom it may concern:*

Be it known that I, WALTER G. DICKER, a citizen of the United States, residing at Gilby, in the county of Grand Forks and State of North Dakota, have invented certain new and useful Improvements in Automobile-Tires, of which the following is a specification.

My invention relates to improvements in cushion tires.

One of the objects of the invention is to provide means for alleviating the strain and sudden jarring to which a vehicle is subjected in traversing undulatory roads or crossings.

Another object contemplated by the invention is the novel corporation of the resilient means for the tire and the device for varying or adjusting said resiliency to suit the occasion.

To the accomplishment of the recited object and others coördinate therewith, the preferred embodiment of my invention resides in that construction and arrangement of parts hereinafter described, illustrated in the accompanying drawings, and embraced within the scope of the appended claims.

In said drawings:—Figure 1 is an elevation of a wheel embodying my invention, a portion of the tire and rim being broken away to more clearly illustrate the manner of securing the terminals of said tire. Fig. 2 is a central vertical section of the wheel and tire, and Fig. 3 is a fragmentary plan view of the felly.

Similar reference characters designate corresponding parts throughout the several views.

In carrying out my invention I employ a cushion tire 5 having a plurality of air chambers or compartments 6 arranged at points equidistant from each other, the intermediate solid portions being equipped with a medially disposed elongated slot 8, the latter being maintained in proper relative position by the transversely extending pin 9. As will be found upon inspection of Fig. 1 of the accompanying drawing one of the terminals, both of which are made solid for this purpose, is rabbeted to serve as a tenon or mortise 10 for engagement with the complementary opening 11 in the opposite end of this tire. It will thus be seen that I attain a very desirable fastening means for the extremital portions of the tire by this foregoing correlative arrangement just stated, and that furthermore said tire is held against lateral displacement with respect to the felly through the medium of the transversely arranged pins 9. In this instance I preferably construct the felly or rim of the wheel so as to have considerable depth. Adjacent the base of the felly and positioned to secure the greatest possible amplitude of movement are a series of coil springs 13, having their distal ends fastened to the eye-bolts 14 which in turn project through the opposite portions of the walls 15 and are designed to be adjusted by the appropriate manipulation of the nuts 16.

From the foregoing explication it will be readily seen that I attain the maximum resiliency of the organization, and this is due particularly to the fact of the tire's being equipped with a plurality of air chambers 6 and the utilization of yieldable bearings or supports 13. Another inherent advantage of the arrangement lies in the provision of the eye-bolts 14 and the nuts 16 on either side of the walls 15 of the rim and the consequent facility with which these parts may be operated to vary the tension of the springs 13 and commensurately the resiliency of the tire.

It should be understood that in its broader aspect my invention comprehends the employment not only of the means described, but of equivalent means for performing the recited functions.

While the arrangement shown is thought, at the present time, to be preferable, it is desired to reserve the right to effect such modifications and variations thereof as may come fairly within the scope of the appended claims.

Having thus described the invention, what is claimed as new, is:—

1. The combination with a U shaped wheel felly, of a cushion tire having a plurality of air chambers and intermediate solid portions, yieldable supports for said tire, said supports being mounted within and extending transversely of said felly, fastening devices for said supports, said devices extending through the sides of the felly, and means on the outer terminals of said devices for adjusting the tension of said supports.

2. The combination with a U shaped felly, of a cushion tire having a plurality of air chambers and intermediate solid portions, coil springs for supporting said tire, said springs being mounted within and extending transversely of said felly, eye-bolts extending through opposite sides of said felly and having their inner ends connected to said springs, and means on the outer ends of said bolts for adjusting the tension of said springs.

3. The combination with a U shaped wheel felly, of a cushion tire having air chambers and intermediate solid portions, yieldable supports for said tire, said solid portions having slots arranged medially and transversely thereof, pins connected to opposite sides of said felly and extending through said slots, and means for adjusting the tension of said supports.

In testimony whereof I hereunto affix my signature in presence of two witnesses.

WALTER G. DICKER.

Witnesses:
 Geo. S. Muir,
 F. L. McLean.